US006540217B2

(12) United States Patent
Takahashi et al.

(10) Patent No.: US 6,540,217 B2
(45) Date of Patent: Apr. 1, 2003

(54) CLAMP APPARATUS

(75) Inventors: Kazuyoshi Takahashi, Tokyo (JP); Atsushi Tamai, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/917,694

(22) Filed: Jul. 31, 2001

(65) Prior Publication Data

US 2002/0017751 A1 Feb. 14, 2002

(30) Foreign Application Priority Data

Aug. 4, 2000 (JP) ....................................... 2000-237674

(51) Int. Cl.[7] .................................................. B23Q 3/03
(52) U.S. Cl. ........................................................ 269/32
(58) Field of Search ............................. 269/32, 27, 24, 269/228, 233, 93, 94, 235, 239

(56) References Cited

U.S. PATENT DOCUMENTS 4,458,889 A 7/1984 McPherson et al. .......... 269/32
5,460,358 A * 10/1995 Sendoykas ................... 269/32

* cited by examiner

*Primary Examiner*—Robert C. Watson
(74) *Attorney, Agent, or Firm*—Paul A. Guss

(57) ABSTRACT

A clamp apparatus comprises a toggle link mechanism including a link plate connected to a rod member and a support lever linked to the link plate, for converting rectilinear motion of the rod member into rotary motion, a long hole formed for the link plate, for being engaged with a knuckle pin provided on a first end side of the rod member, and a lever stopper formed with a fastening surface for regulating a rotary action of the support lever.

6 Claims, 15 Drawing Sheets

CLAMP APPARATUS

BACKGROUND OF THE INVENTION

1. Field of the Invention

The present invention relates to a clamp apparatus capable of clamping a workpiece by means of an arm which is rotatable by a predetermined angle in accordance with a driving action of a driving mechanism.

2. Description of the Related Art

A clamp cylinder has conventionally been used in order to clamp a component to be welded of an automobile or the like. Such a clamp cylinder is disclosed, for example, in U.S. Pat. No. 4,458,889.

As shown in FIGS. 14 and 15, in the clamp cylinder disclosed in U.S. Pat. No. 4,458,889, a piston rod 2, which is movable back and forth in accordance with a driving action of a cylinder 1*c*, is arranged between a pair of divided bodies 1*a*, 1*b*. A coupling 3 is connected to a first end of the piston rod 2. A pair of links 5*a*, 5*b* and a 20 pair of rollers 6*a*, 6*b* are rotatably installed to both sides of the coupling 3 respectively by the aid of a first shaft 4. An arm 8, which is rotatable by a predetermined angle, is connected between the pair of links 5*a*, 5*b* by the aid of a second shaft 7.

In this case, the pair of rollers 6*a*, 6*b* are provided slidably by the aid of a plurality of needles 9*a* which are installed to holes. The piston rod 2 is provided displaceably integrally with the rollers 6*a*, 6*b* in accordance with a guiding action of the rollers 6*a*, 6*b* which are slidable along track grooves 9*b* formed on the bodies 1*a*, 1*b* respectively.

However, in the above conventional clamp cylinder disclosed in U.S. Pat. No. 4,458,889, the clamping force of the arm 8 clamping a workpiece is lowered on account of the rotation angle of the arm 8 since the size, the thickness or the like of the workpiece (not shown) held by the arm 8 varies.

In other words, the rotation angle of the arm 8 is changed on account of an attachment attitude or the like of the clamp cylinder when the workpiece is clamped. As a result, the clamping force of the arm 8 clamping the workpiece is changed (lowered).

SUMMARY OF THE INVENTION

It is a general object of the present invention to provide a clamp apparatus which makes it possible to maintain substantially constant clamping force of an arm clamping a workpiece even when a rotation angle of the arm is changed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
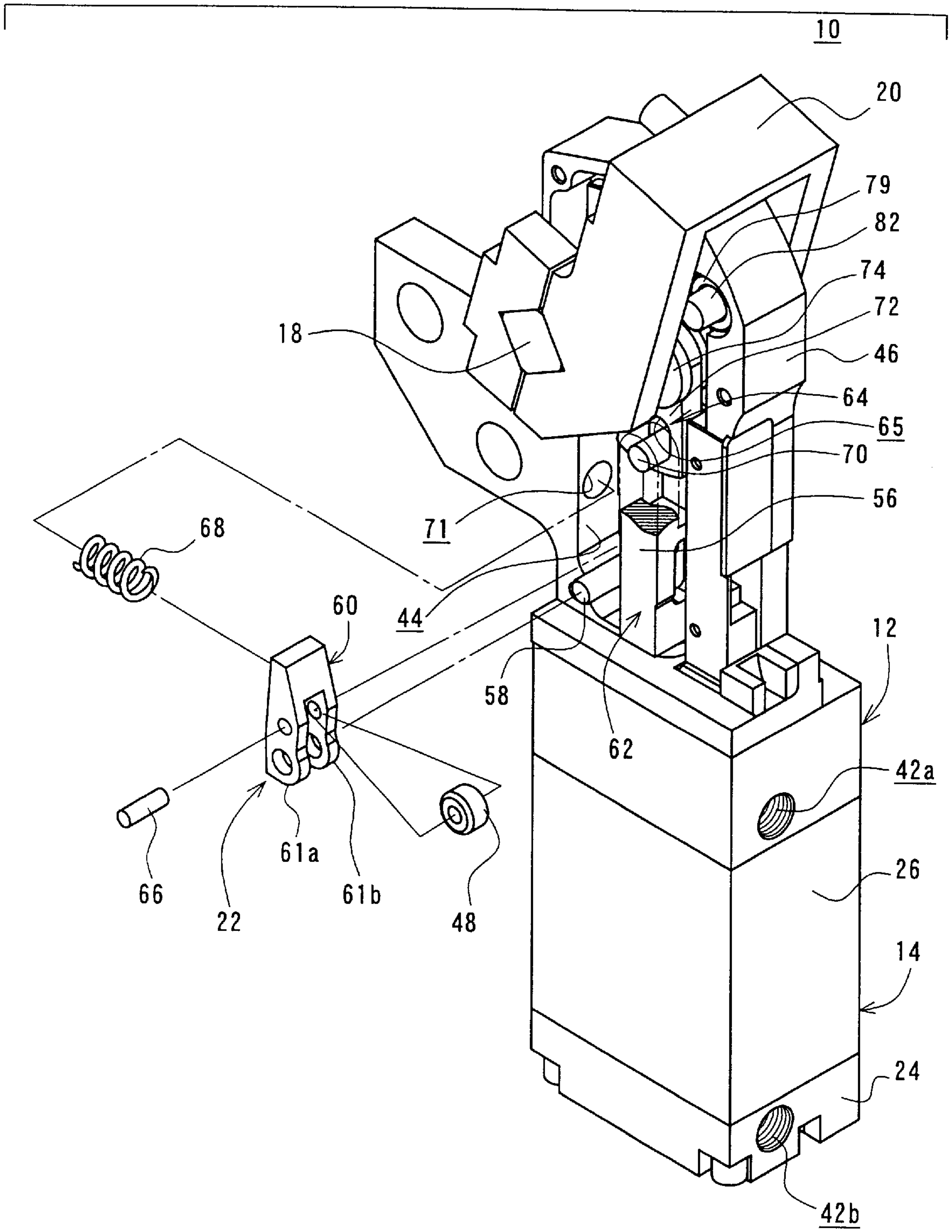
FIG. 1 shows an exploded perspective view illustrating major parts of a clamp apparatus according to an embodiment of the present invention.
Figure 2:
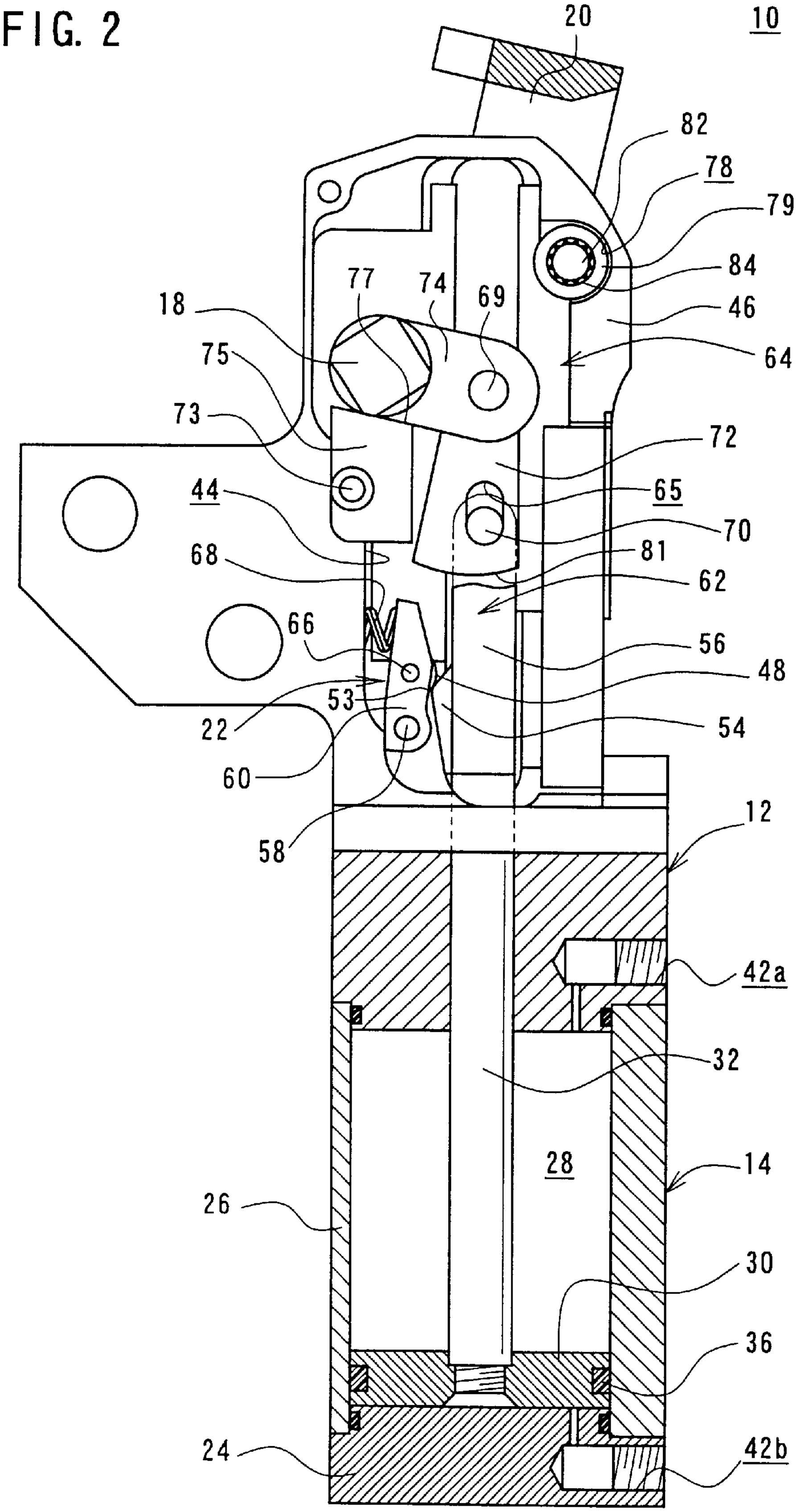
FIG. 2 shows a partial vertical sectional view taken along an axial direction of the clamp apparatus according to the embodiment of the present invention.

In FIGS. 1 and 2, reference numeral 10 indicates a clamp apparatus according to an embodiment of the present invention.

The clamp apparatus 10 comprises a body 12, a cylinder section (driving mechanism) 14 which is connected to a lower end of the body 12 in an air-tight manner, an arm 20 which is connected to a bearing section 18 having a rectangular cross section protruding to the outside through a pair of substantially circular openings (not shown) formed through the body 12, and a lock mechanism 22 which is provided at the inside of the body 12 and which holds the arm 20 at the initial position in the unclamping state.

The cylinder section 14 includes an end block 24, and an angular barrel-shaped cylinder tube 26 which has its first end connected to a recess of the end block 24 in an air-tight manner and its second end connected to the body 12 in an air-tight manner.

As shown in FIG. 2, the cylinder section 14 further includes a piston 30 which is accommodated in the cylinder tube 26 and which is movable reciprocatively along the cylinder chamber 28, and a rod member 32 which is connected to a central portion of the piston 30 and which is displaceable integrally with the piston 30. A cross section of the piston 30, which is substantially perpendicular to the axis of the rod member 32, is formed to have a substantially elliptic configuration. The cross-sectional configuration of the cylinder chamber 28 is also formed to be a substantially elliptic configuration corresponding to the piston 30.

A piston packing 36 is installed to the outer circumferential surface of the piston 30.

Unillustrated attachment holes are bored through four corner portions of the end block 24. The end block 24, the cylinder tube 26, and the body 12 are assembled in an air-tight manner respectively by the aid of four shafts (not shown) inserted into the attachment holes. A pair of pressure fluid inlet/outlet ports 42*a*, 42*b* for introducing/discharging the pressure fluid (for example, compressed air) with respect to the cylinder chamber 28 are formed on the body 12 and the end block 24 respectively.

The body 12 is constructed by integrally assembling a first casing 46 and an unillustrated second casing. A chamber 44 is formed in the body 12 by recesses formed on the first casing 46 and the unillustrated second casing respectively. A free end of the rod member 32 faces to the interior of the chamber 44.

A toggle link mechanism 64 for converting the rectilinear motion of the rod member 32 into the rotary motion of the arm 20 by the aid of a knuckle joint 62 is provided at a first end of the rod member 32. The knuckle joint 62 comprises a knuckle block 56 having a forked section with branches which are separated from each other by a predetermined distance and which are branched substantially in parallel to one another, and a knuckle pin 70 which is rotatably installed to holes formed through the branches. An engaging section 54, which has a first inclined surface 50 and a second inclined surface 52 to be engaged with a roller member 48 as described later on, is formed on a first side surface of the knuckle block 56 (see FIG. 3).

The toggle link mechanism 64 includes a link plate (link member) 72 which is connected between the branches of the forked section of the knuckle joint 62 by the aid of a knuckle pin 70, and a support lever 74 which is rotatably supported by a pair of substantially circular openings formed through the first casing 46 and the unillustrated second casing respectively. The support lever 74 may be formed integrally with the arm 20.

The link plate 72 is interposed between the knuckle joint 62 and the support lever 74 for linking the knuckle joint 62 and the support lever 74.

The link plate 72 has a long hole 65 formed on a first end side thereof and having a substantially elliptic configuration, and a hole (not shown) formed on a second end side. The link plate 72 is connected to the free end of the rod member 32 by the aid of the knuckle joint 62 and the knuckle pin 70 engaged with the long hole 65. The link plate 72 is connected to the forked section of the support lever 74 by the aid of a link pin 69 which is rotatably installed to the hole. A curved surface 81 contacting with a guide roller 79 as described later on is formed at a first end of the link plate 72 (see FIG. 2).

In this arrangement, the long hole 65 engaged with the knuckle pin 70 is formed for the link plate 72 to provide a clearance for the knuckle pin 70. Accordingly, the link plate 72 has a degree of freedom capable of displacing within a range of the long hole 65. In other words, the contact portion between the guide roller 79 and the curved surface 81 formed on the link plate 72 can be maintained at a substantially constant position regardless of the rotation angle of the arm 20.

The support lever 74 has a forked section with branches which are formed with holes for rotatably installing the link pin 69 thereto, and the bearing section 18 having a rectangular cross section which is formed to protrude in a direction (direction substantially perpendicular to the plane of the paper in FIG. 2) substantially perpendicular to the axis of the rod member 32. In addition, the bearing section 18 is exposed to the outside from the body 12 through unillustrated openings. The arm 20 for clamping an unillustrated workpiece is detachably installed to the bearing section 18. Therefore, the support lever 74 is provided to rotate integrally with the arm 20.

A lever stopper (fastening mechanism) 75, which is fixed to an inner wall corner portion of the first casing 46 by the aid of a screw member 73, is provided below the bearing section 18. The lever stopper 75 regulates the rotary action of the support lever 74. The lever stopper 75 is formed with a fastening surface 77 which is inclined downwardly to the right by a predetermined angle.

The lever stopper 75 may be formed to expand integrally with the first casing 46 or the unillustrated second casing instead of separately constructing the lever stopper 75.

Figure 3:
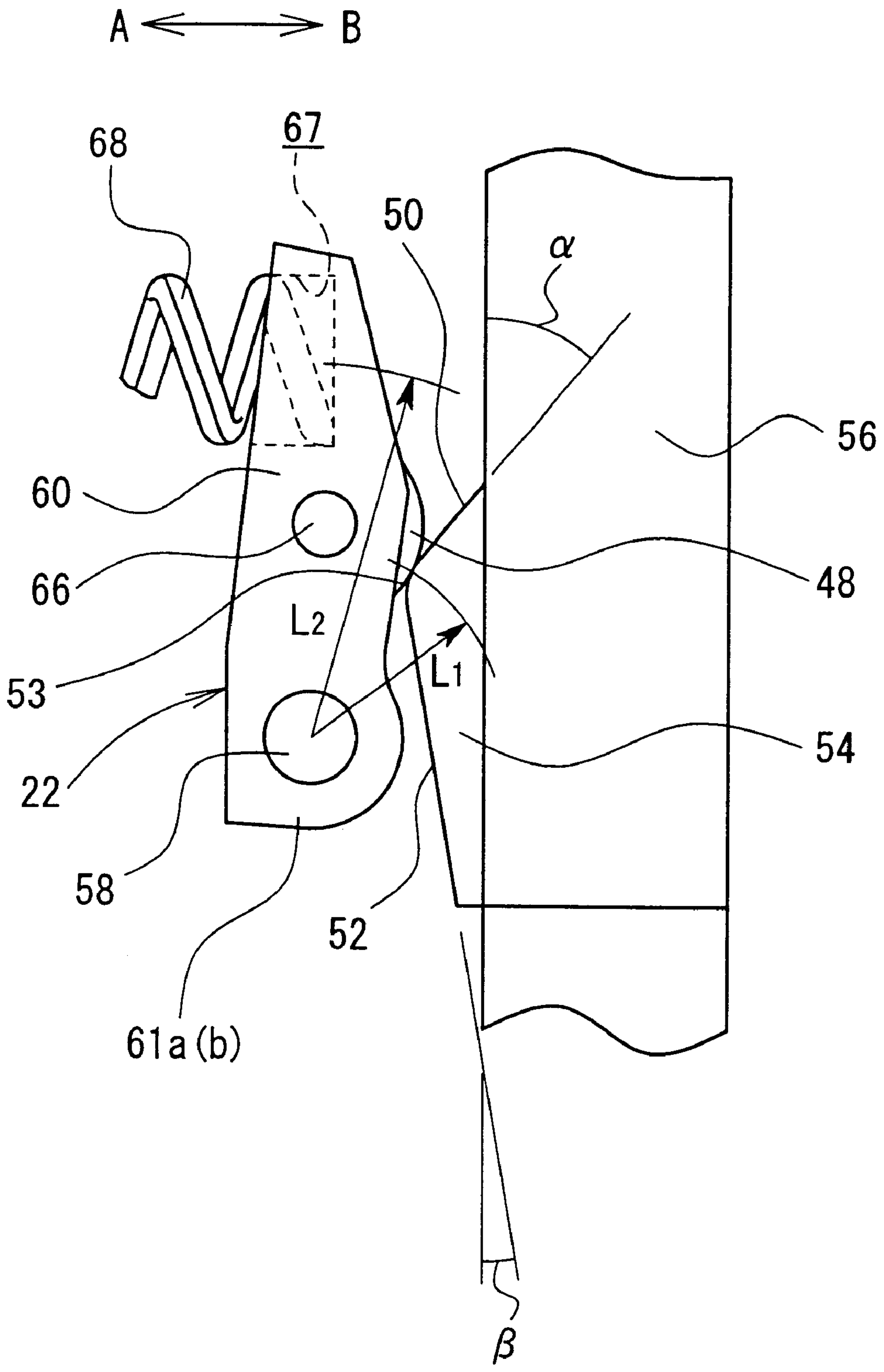
FIG. 3 shows a partial magnified view illustrating a lock mechanism shown in FIG. 2.

As shown in FIGS. 1 and 3, the lock mechanism 22 includes a support point pin 58 which is arranged in the chamber 44 and which is supported by the first casing 46 and the unillustrated second casing, a lock plate 60 which is provided rotatably by a predetermined angle about the support point of the support point pin 58 rotatably installed to the first end side, a roller member 48 which is supported rotatably between branched tabs 61*a*, 61*b* of the lock plate 60 by the aid of the pin member 66, an engaging section 54 which is provided on the knuckle block 56 described above and which has the first inclined surface 50, the second inclined surface 52, and a ridge section 53 formed at a boundary portion between the first inclined surface 50 and the second inclined surface 52 so that the roller member 48 is engageable therewith, and a spring member 68 which has its first end fastened by a recess 67 formed on the end side of the lock plate 60 disposed on the side opposite to the support point pin 58.

The spring member 68 has a second end fastened to a recess 71 which is formed on the inner wall surface of the first casing 46. The spring member 68 constantly presses the lock plate 60 under the resilient force thereof in a direction indicated by an arrow B about the support point of the support point pin 58. In other words, the lock plate 60 can be rotated by a predetermined angle in a direction indicated by an arrow A about the support point of the support point pin 58 by exerting on the roller member 48 the pressing force that is more than the resilient force of the spring member 68.

As shown in FIG. 3, the angle of inclination $\alpha$ of the first inclined surface 50 and the angle of inclination $\beta$ of the second inclined surface 52 with respect to the vertical plane are set respectively so that $\alpha > \beta$ can be satisfied. In this case, it is preferable that the angle of inclination $\alpha$ is set to be about 30 degrees to 45 degrees and the angle of inclination $\beta$ is set to be about 10 degrees to 20 degrees.

It is assumed that $L_1$ represents the spacing distance from the central point of the support point pin 58 to the abutment point at which the roller member 48 and the engaging section 54 abut (central point of the pin member 66), and $L_2$ represents the spacing distance from the central point of the support point pin 58 to the pressing point at which the spring member 68 presses. Then, the holding force of the lock mechanism 22 can be increased by setting the value of $L_2/L_1$ to be large.

Recesses 78 having a circular arc-shaped cross section are formed on the respective upper sides of the inner wall surfaces of the first casing 46 and the unillustrated second casing of the body 12. The recesses 78 have a guide roller

Figure 4:
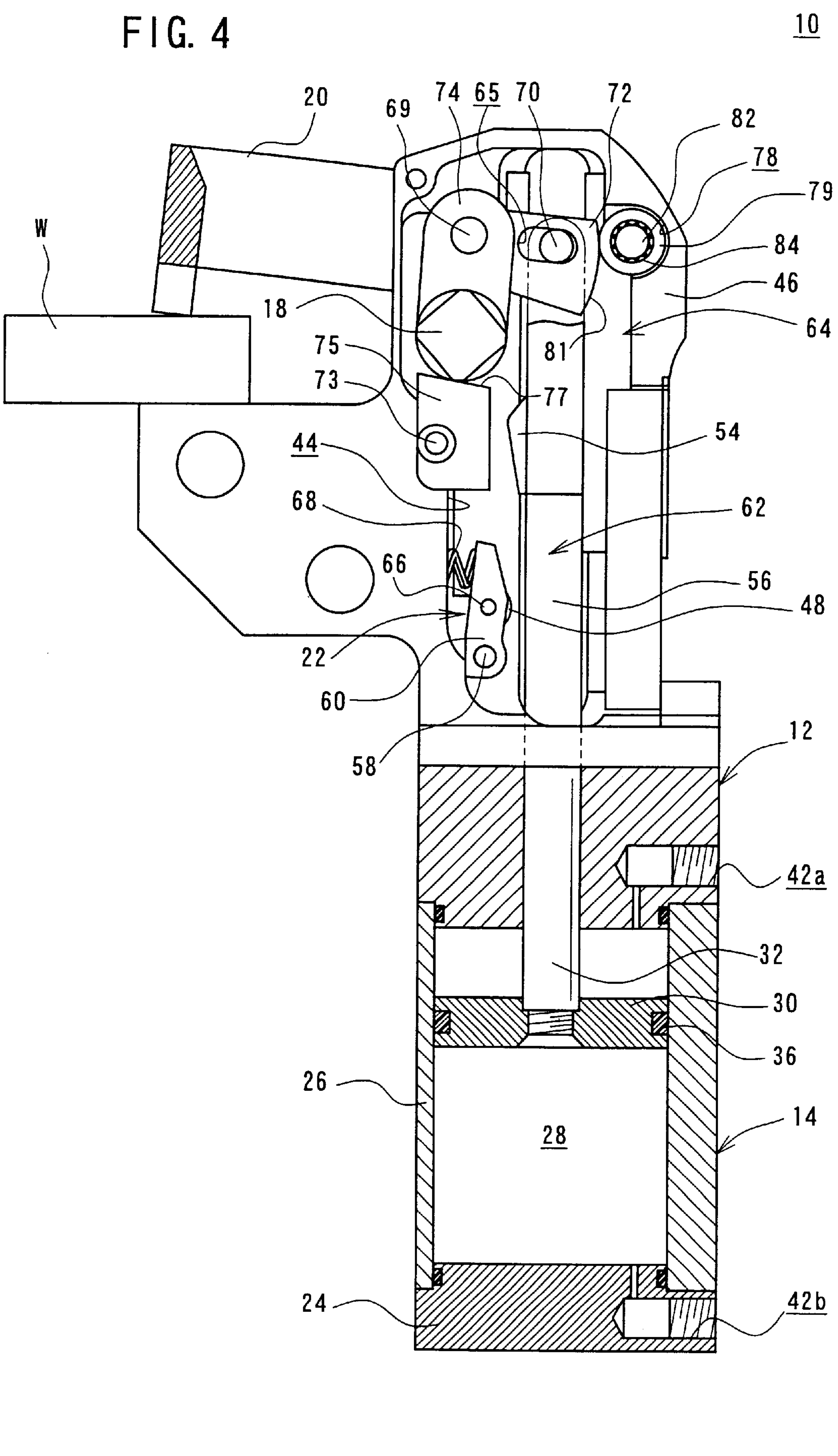
FIG. 4 shows, with vertical cross section, a side view illustrating a state in which an arm is rotated starting from an initial position shown in FIG. 1, and a workpiece is clamped.
Figure 5:
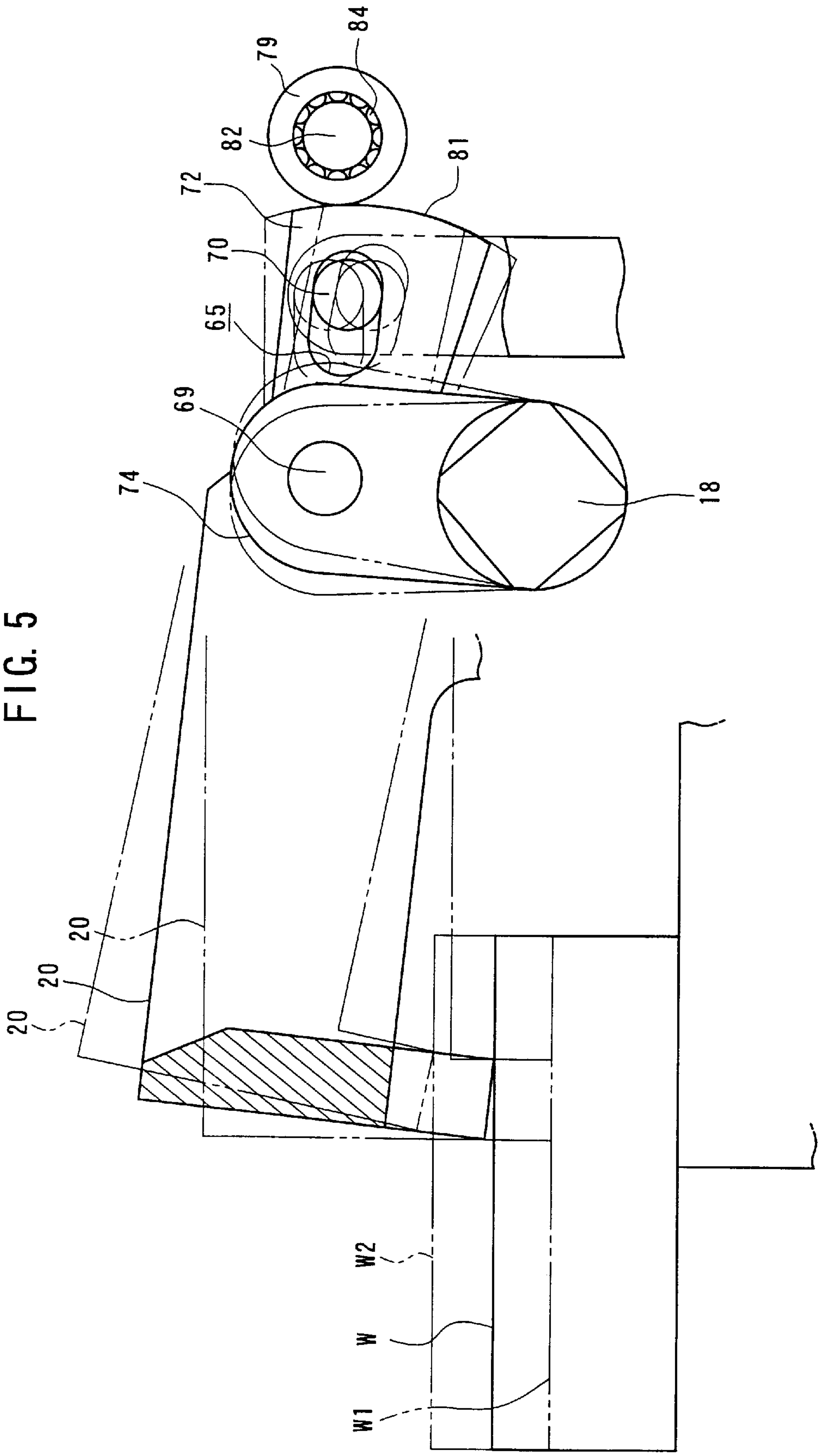
FIG. 5 shows, with partial omission, a side view illustrating states of engagement of a knuckle pin with respect to a long hole when the thickness of a workpiece differs.

79 provided therein which can be rotated by a predetermined angle by contacting with the curved surface 81 of the link plate 72 (see FIGS. 4 and 5).

A pin member 82 for rotatably supporting the guide roller 79 is secured to holes which are formed on the first casing 46 and the unillustrated second casing. A plurality of needle bearings 84 are installed to a through-hole of the guide roller 79 in a circumferential direction. The guide roller 79 is rotated smoothly by the rolling action of the needle bearings 84.

The clamp apparatus 10 according to the embodiment of the present invention is basically constructed as described above. Next, its operation, function, and effect will be explained.

The clamp apparatus 10 is fixed at a predetermined position by the aid of an unillustrated fixing mechanism. First ends of pipes such as unillustrated tubes are connected to the pair of pressure fluid inlet/outlet ports 42*a,* 42*b* respectively. Second ends of the pipes are connected to an unillustrated pressure fluid supply source.

Then, the unillustrated pressure fluid supply source is energized to introduce the pressure fluid (for example, compressed air) from the first pressure fluid inlet/outlet port 42*b* into the cylinder chamber 28 disposed on the lower side of the piston 30. The piston 30 is pressed by the action of the pressure fluid introduced into the cylinder chamber 28, and is moved upwardly along the cylinder chamber 28.

The rectilinear motion of the piston 30 is transmitted to the toggle link mechanism 64 by the aid of the rod member 32 and the knuckle joint 62, and is converted into the rotary motion of the arm 20 by the rotary action of the support lever 74 of the toggle link mechanism 64.

In other words, the link plate 72 and the knuckle joint 62 engaged with the free end of the rod member 32 are upwardly pressed by the rectilinear motion (upward movement) of the piston 30. The pressing force exerted on the link plate 72 rotates the link plate 72 by a predetermined angle about the support point of the knuckle pin 70. Furthermore, the above pressing force rotates the support lever 74 in accordance with the linking action of the link plate 72.

Therefore, the arm 20 is rotated by a predetermined angle in a counterclockwise direction about the support point of the bearing section 18 of the support lever 74.

While the arm 20 is rotated in the above counterclockwise direction, the curved surface 81 of the link plate 72 contacts with the guide roller 79. The guide roller 79 being in contact with the curved surface 81 is rotated about the center of the pin member 82.

The arm 20 that is further rotated abuts against the unillustrated workpiece W and stops the rotary action thereof. As a result, the arm 20 clamps the workpiece W (see FIG. 4).

As shown in FIG. 5, when the rotation angle of the arm 20 clamping workpieces (W, W1, W2) is changed on account of the different thickness of the respective workpieces (W, W1, W2) or the like, the link plate 72 is slightly displaced along the long hole 65 engaged with the knuckle pin 70. The clamping force of the arm 20 can be then maintained to be substantially constant since the link plate 72 can freely displace within the range of the long hole 65, and the degree of freedom is also given to some extent to the support lever 74 and the arm 20 which follow the link plate 72.

In other words, the degree of freedom is provided for the link plate 72 within the range of the long hole 65 and the contact point between the curved surface 81 of the link plate 72 and the guide roller 79 is maintained at an identical and constant position. Accordingly, in the embodiment of the present invention, the clamping force of the arm 20 can be maintained to be substantially constant even when the rotation angle of the arm 20 clamping the workpiece W is changed.

Subsequently, when the arm 20 is released from clamping the workpiece W, the pressure fluid is introduced into the cylinder chamber 28 disposed on the upper side of the piston 30 from the second pressure fluid inlet/outlet port 42*a* disposed on the opposite side in accordance with the switching action of an unillustrated directional control valve. The piston 30 is pressed by the action of the pressure fluid introduced into the cylinder chamber 28. The piston 30 is moved downwardly along the cylinder chamber 28.

Figure 6:
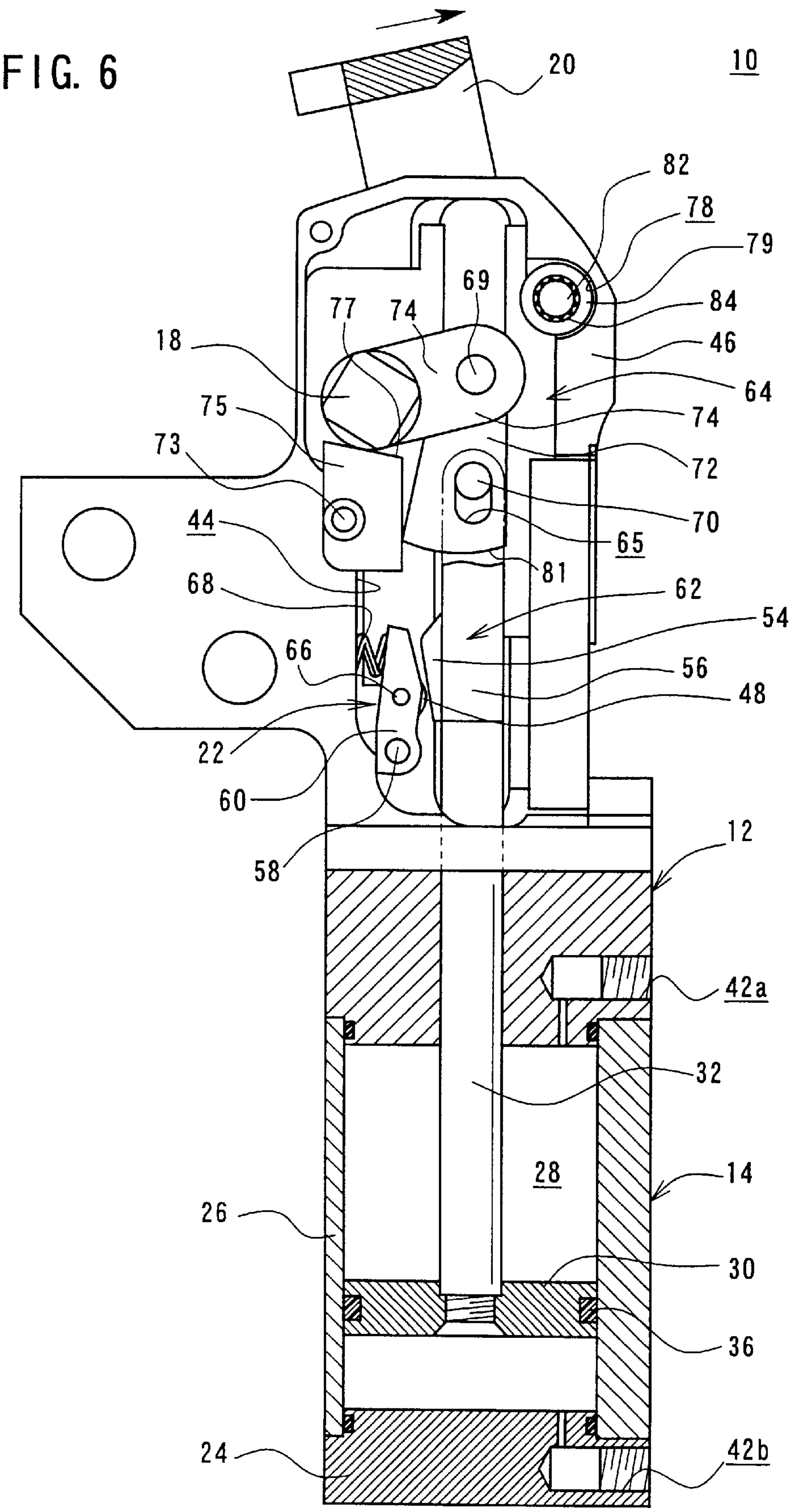
FIG. 6 shows, with partial vertical cross section, a side view illustrating a state in which the arm is rotated by a predetermined angle in the clockwise direction starting from the state shown in FIG. 4.

The rectilinear motion of the piston 30 is converted into the rotary motion of the arm 20 by the aid of the toggle link mechanism 64, and the arm 20 is rotated in a clockwise direction (see FIG. 6).

Figure 7:
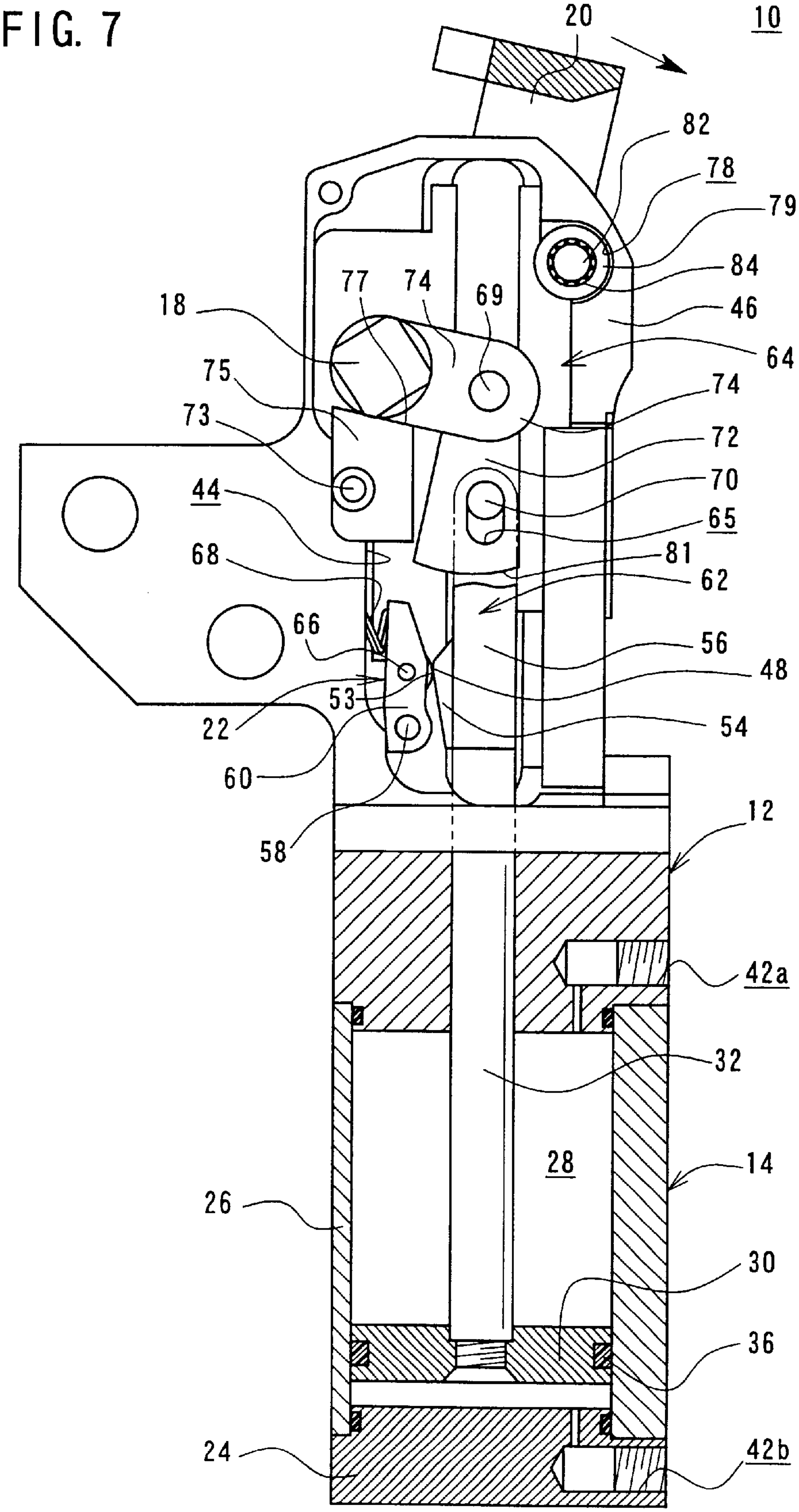
FIG. 7 shows, with partial vertical cross section, a side view illustrating a state in which the arm is further rotated by a predetermined angle in the clockwise direction starting from the state shown in FIG. 6.
Figure 8:
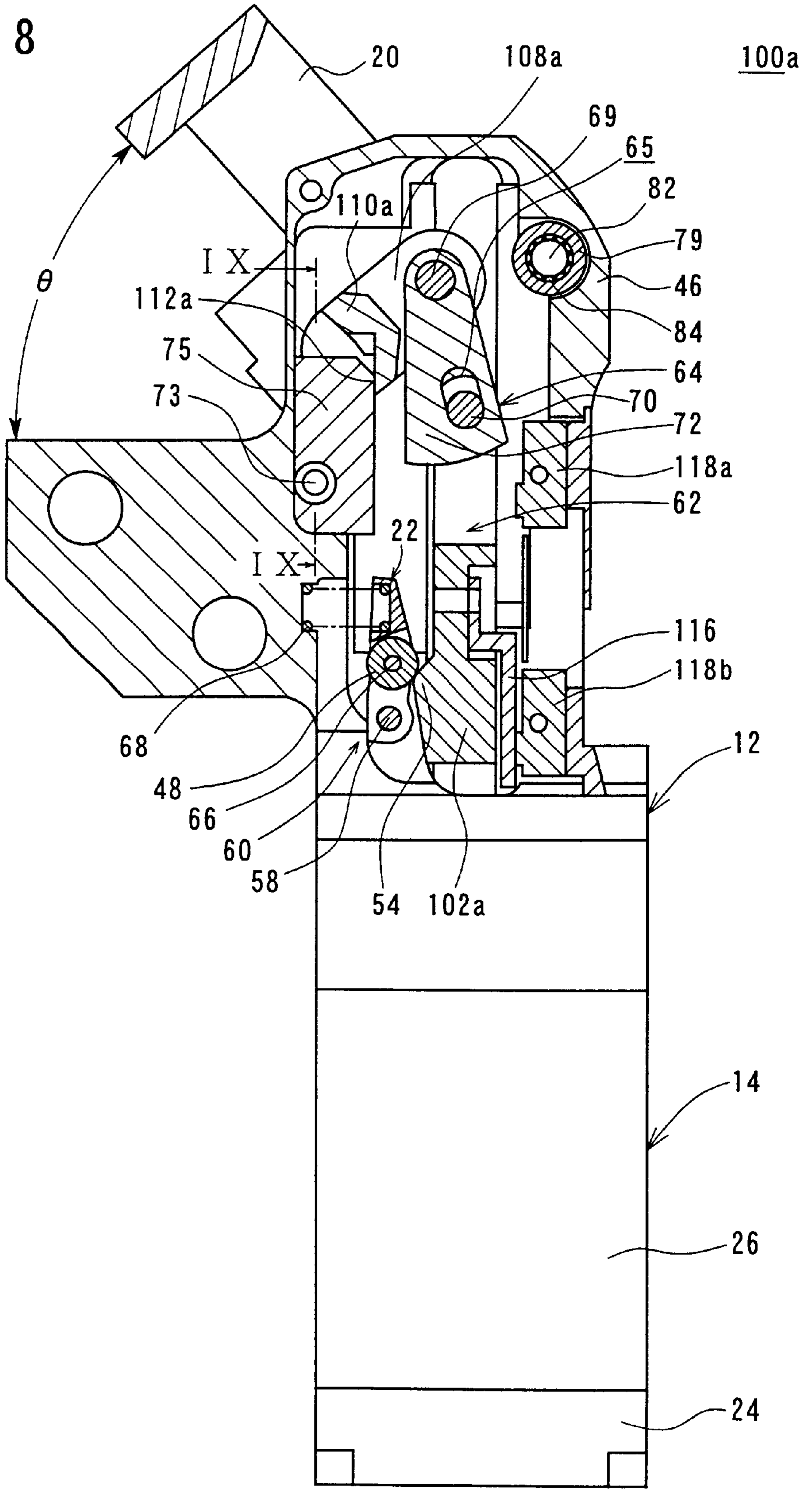
FIG. 8 shows, with partial vertical cross section, a side view taken along the axial direction illustrating a clamp apparatus according to a first modified embodiment of the present invention.
Figure 9:
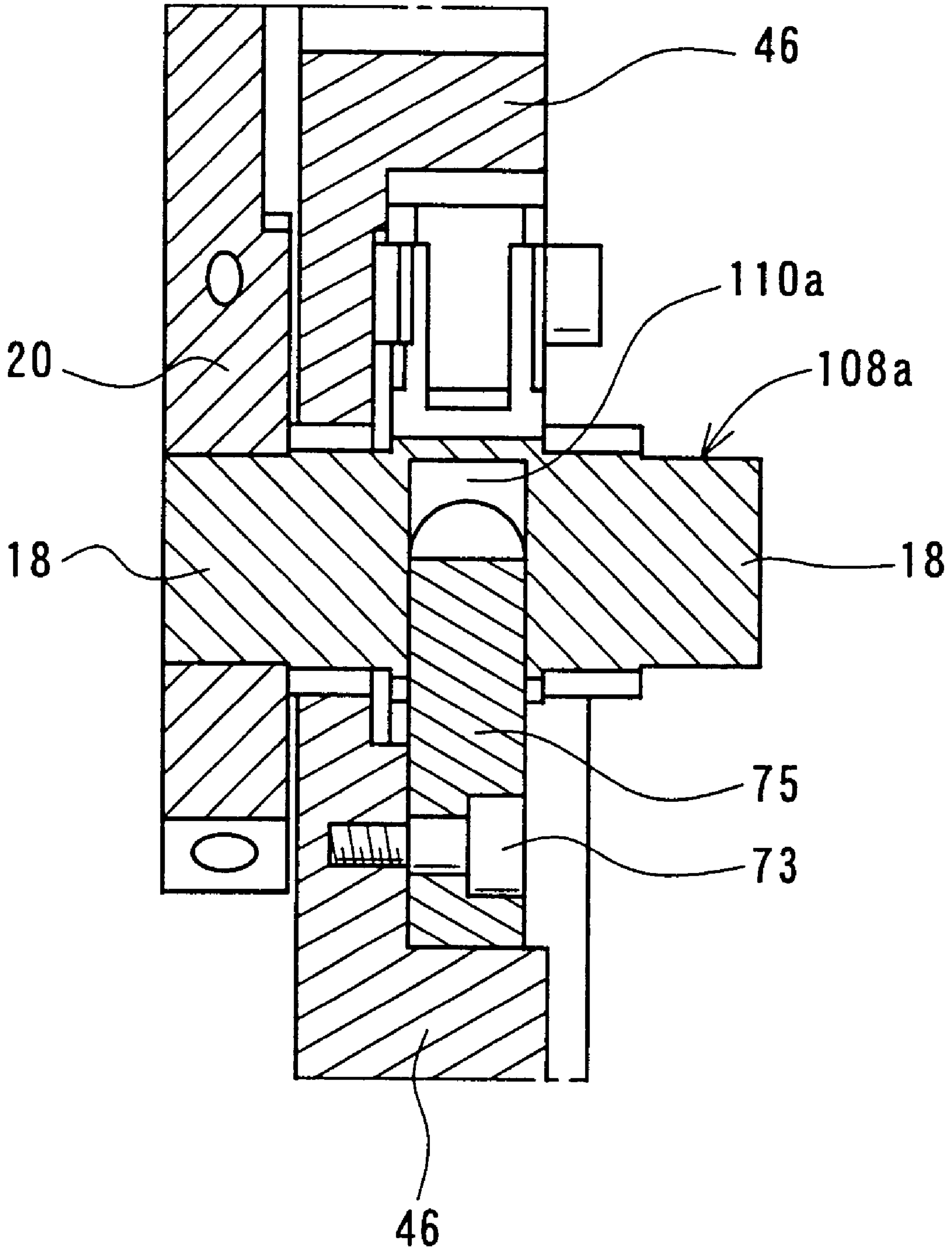
FIG. 9 shows a vertical sectional view taken along a line IX—IX shown in FIG. 8.

When the support lever 74 is rotated in the clockwise direction in cooperation with the rotary action of the arm 20, the side surface of the support lever 74 abuts against the fastening surface 77 of the lever stopper 75 as shown in FIG. 7 to regulate the rotary action of the support lever 74 in the clockwise direction.

FIG. 7 shows the knuckle pin 70 located on the upper side of the long hole 65, and is illustrative of one of engagement states between the knuckle pin 70 and the long hole 65 when the rod member 32 is moved downwardly integrally with the piston 30 and when the arm 20 is rotated in the clockwise direction by an inertial force. Accordingly, the knuckle pin 70 is not necessarily engaged with the upper portion of the long hole 65.

When the rotary action of the support lever 74 in the clockwise direction is regulated by the lever stopper 75, the piston 30 is further displaced downwardly by the action of the pressure fluid supplied to the cylinder chamber 28 disposed on the upper side. The pistion 30 then arrives at the lower limit position shown in FIG. 2. At this time, the rod member 32 and the knuckle block 56 are displaced downwardly integrally with the piston 30. Then, the knuckle pin 70 is slightly moved downwardly along the long hole 65 (see FIGS. 7 and 2 while making comparison with each other).

At the initial position of the unclamping state shown in FIG. 2, the rotary action of the support lever 74 in the clockwise direction is regulated by the fastening action of the lever stopper 75. In addition, the piston 30 arrives at the lower limit position where the piston 30 is regulated so as not to further displace downwardly. Accordingly, the arm 20 is reliably prevented from rotating in the clockwise direction. By contrast, the pressure fluid at a predetermined pressure is kept to be supplied to the cylinder chamber 28 disposed on the upper side, and the piston 30 is moved upwardly by the action of the supplied pressure fluid. Accordingly, the arm 20 is reliably prevented from rotating in the counterclockwise direction.

As described above, even if the long hole 65 is provided to obtain the substantially constant clamping force of the arm 20, the degree of freedom allowed by the long hole 65 is restricted at the initial position of the unclamping state. Accordingly, it is possible to reliably avoid in the arm 20 any backlash which would be otherwise caused by the long hole 65.

Next, explanation will be made for the function and the effect of the lock mechanism 22.

Before the arm 20 is rotated in the clockwise direction to allow the piston 30 to arrive at the lower limit position, the second inclined surface 52 of the engaging section 54, which is moved downwardly integrally with the knuckle block 56, is engaged with the roller member 48 rotatably supported by the lock plate 60 (see FIG. 7).

In this situation, the lock plate 60 is pressed in the direction indicated by the arrow A against the resilient force of the spring member 68. The roller member 48, which is rotatably supported by the lock plate 60, rides over the second inclined surface 52 of the engaging section 54 and the ridge section 53 formed at the boundary portion between the second inclined surface 52 and the first inclined surface 50 respectively. The roller member 48 is then engaged with the first inclined surface 50. Accordingly, the arm 20 is locked at the initial position in the unclamping state thereof (see FIG. 2).

In this embodiment, the initial position refers to the state where the piston 30 arrives at the lower limit position of the cylinder chamber 28 as shown in FIG. 2.

In the above locked state, the second pressure fluid inlet/outlet port 48*b* is also open to the atmospheric air. Therefore, even when the supply of the pressure fluid is somehow stopped at the initial position in the unclamping state of the arm 20, the lock mechanism 22 reliably maintains the unclamping state thereof and does not release it.

In addition, the lock mechanism 22 can reliably maintain the unclamping state of the arm 20 even if the supply of the pressure fluid to the cylinder section 14 as the driving mechanism is stopped and even if the transmission of the driving force to the arm 20 is cut off.

The force (holding force) of the lock mechanism 22 holding the arm 20 in the unclamping state needs to be a proper one for preventing the arm 20 from being displaced on account of the inertial force even if the robot or the like is operated to which the clamp apparatus 10 is installed. Further, the above force (holding force) needs to be able to release the unclamping state by the displacement force of the piston 30 when the pressure fluid is supplied again from the pressure fluid inlet/outlet port 42*b*. In this case, it is preferable that the angle of inclination $\alpha$ of the first inclined surface 50 of the engaging section 54 with respect to the vertical plane is set to be larger than the angle of inclination $\beta$ of the second inclined surface 52. Further, it is preferable that the angle of inclination $\alpha$ of the first inclined surface 50 is set to be about 30 degrees to 45 degrees, and the angle of inclination $\beta$ of the second inclined surface 52 is set to be about 10 degrees to 20 degrees.

Although the cylinder section 14 is used as the driving mechanism in the embodiment of the present invention, the rod member 32 may be displaced by using an unillustrated linear actuator, an electric motor or the like.

Next, clamp apparatuses 100*a*, 100*b* according to first and second modified embodiments of the present invention are shown in FIGS. 8 to 13. The same components as those of the above embodiment shown in FIG. 1 are designated by the same reference numerals, detailed explanation of which will be omitted.

The clamp apparatuses 100*a*, 100*b* according to the first and second modified embodiments are different from the clamp apparatus 10 according to the above-described embodiment in that the angle of rotation $\theta$ of the arm 20 is previously limited to a predetermined angle. In this case, in the first modified embodiment shown in FIG. 8, the angle of rotation $\theta$ of the arm 20 is set to be about 45 degrees. In the second modified embodiment shown in FIG. 11, the angle of rotation $\theta$ of the arm 20 is set to be about 75 degrees. Even when the angle of rotation $\theta$ of the arm 20 is regulated to be the predetermined angle, the lock mechanism 22 locks the arm 20 in the unclamping state at the initial position, which is the same as that in the embodiment described above.

Each of the clamp apparatuses 100*a*, 100*b* according to the first and second modified embodiments comprises a knuckle block 102*a*, 102*b* which is connected to a first end of a rod member 32 and which has a length corresponding to the preset angle of rotation $\theta$ of the arm 20, a link plate 72 which is connected between branches of a forked section of the knuckle block 102*a*, 102*b* by the aid of a knuckle pin 70, and a support lever 108*a*, 108*b* which is rotatably supported by substantially circular openings formed through a first casing 46 and an unillustrated second casing.

Figure 10:
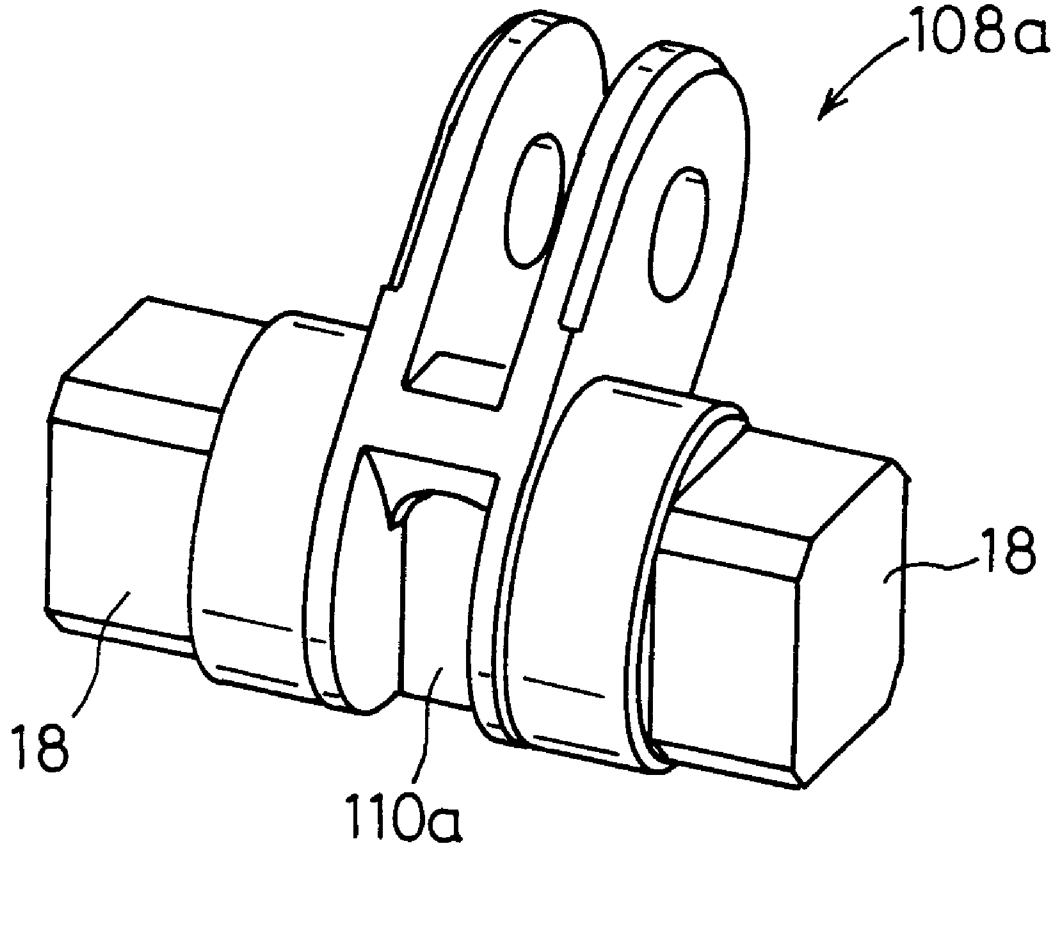
FIG. 10 shows a perspective view illustrating a support lever incorporated in the clamp apparatus according to the first modified embodiment.
Figure 11:
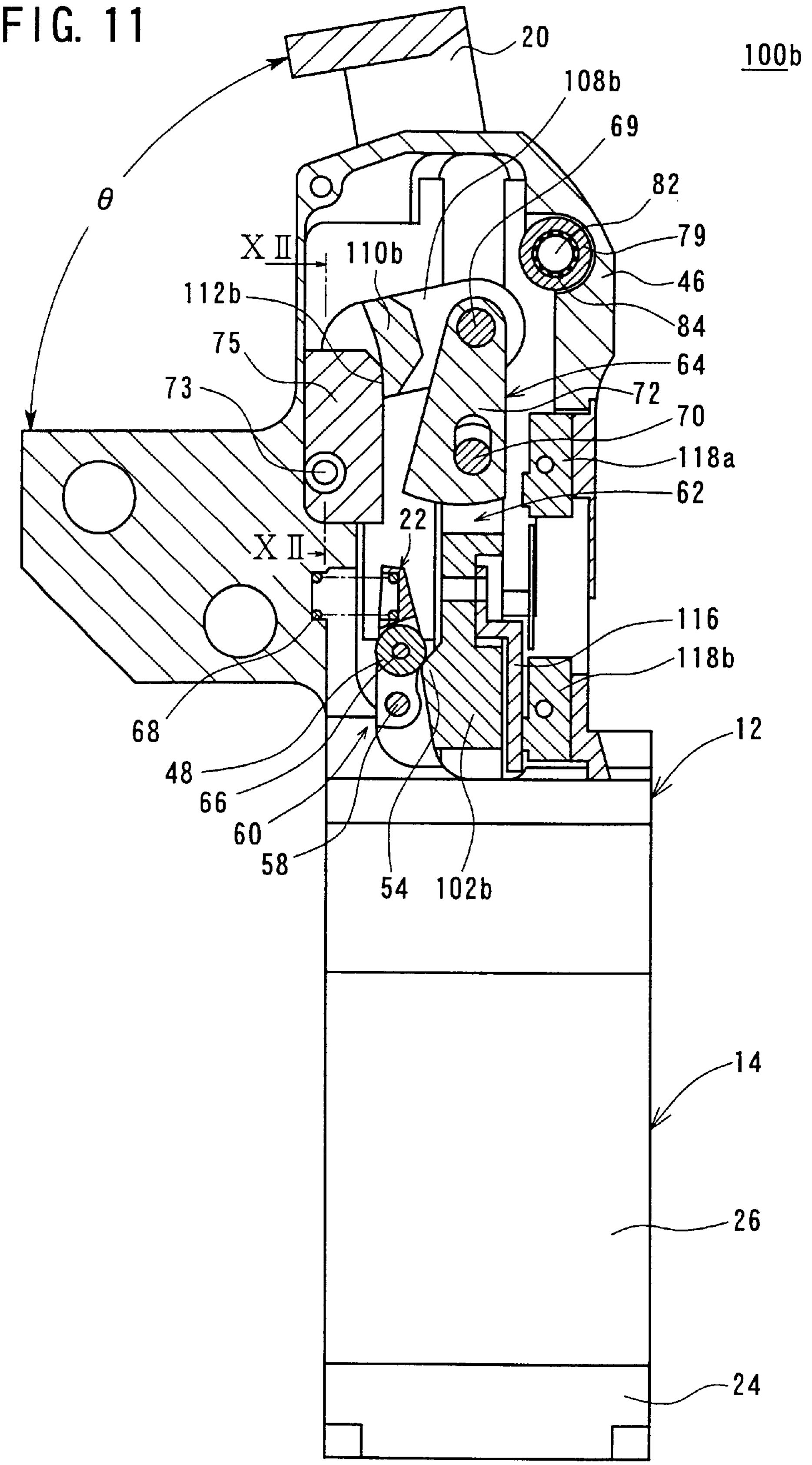
FIG. 11 shows, with partial vertical cross section, a side view taken along the axial direction illustrating a clamp apparatus according to a second modified embodiment of the present invention.
Figure 12:
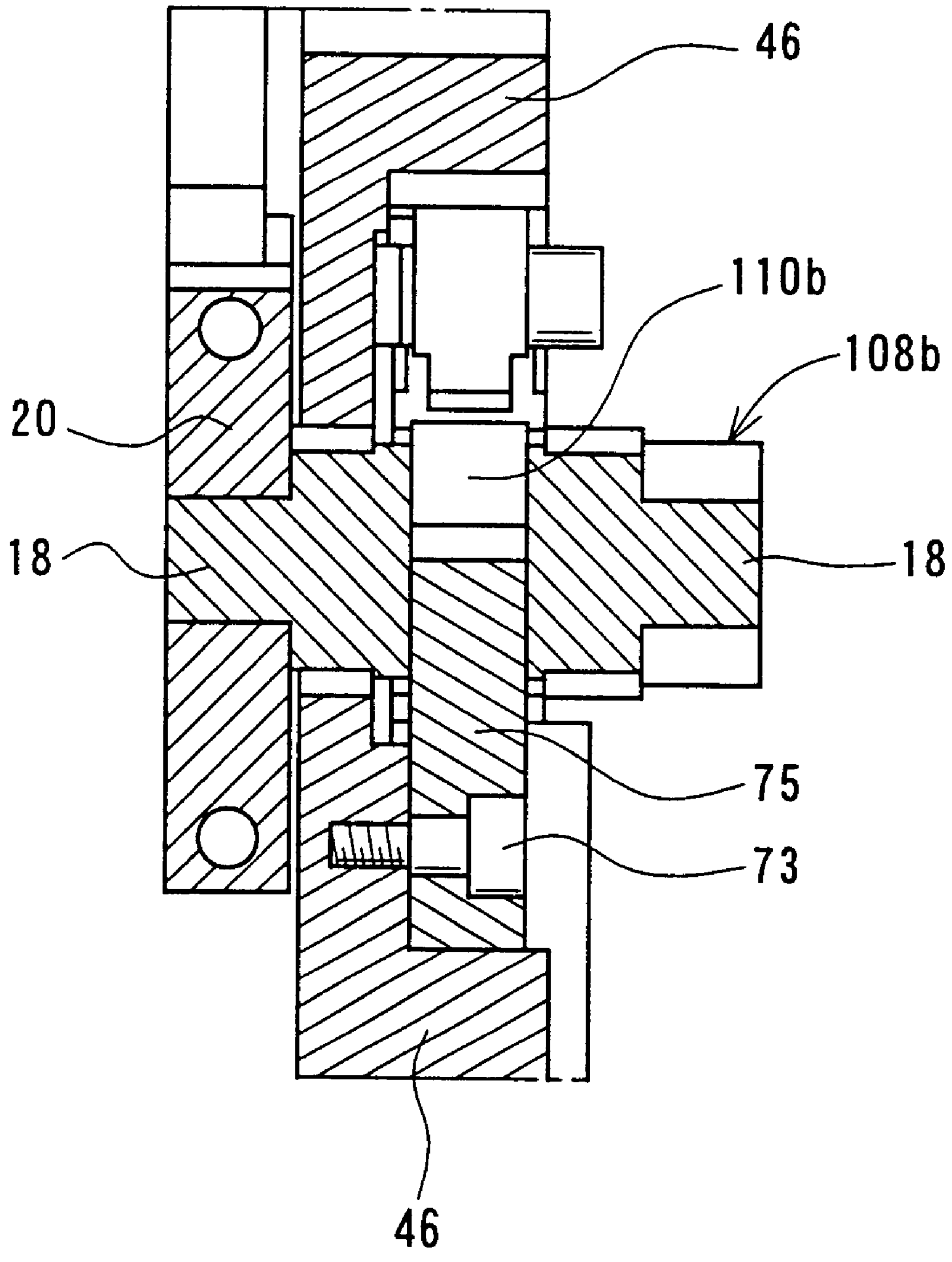
FIG. 12 shows a vertical sectional view taken along a line XII—XII shown in FIG. 11.
Figure 13:
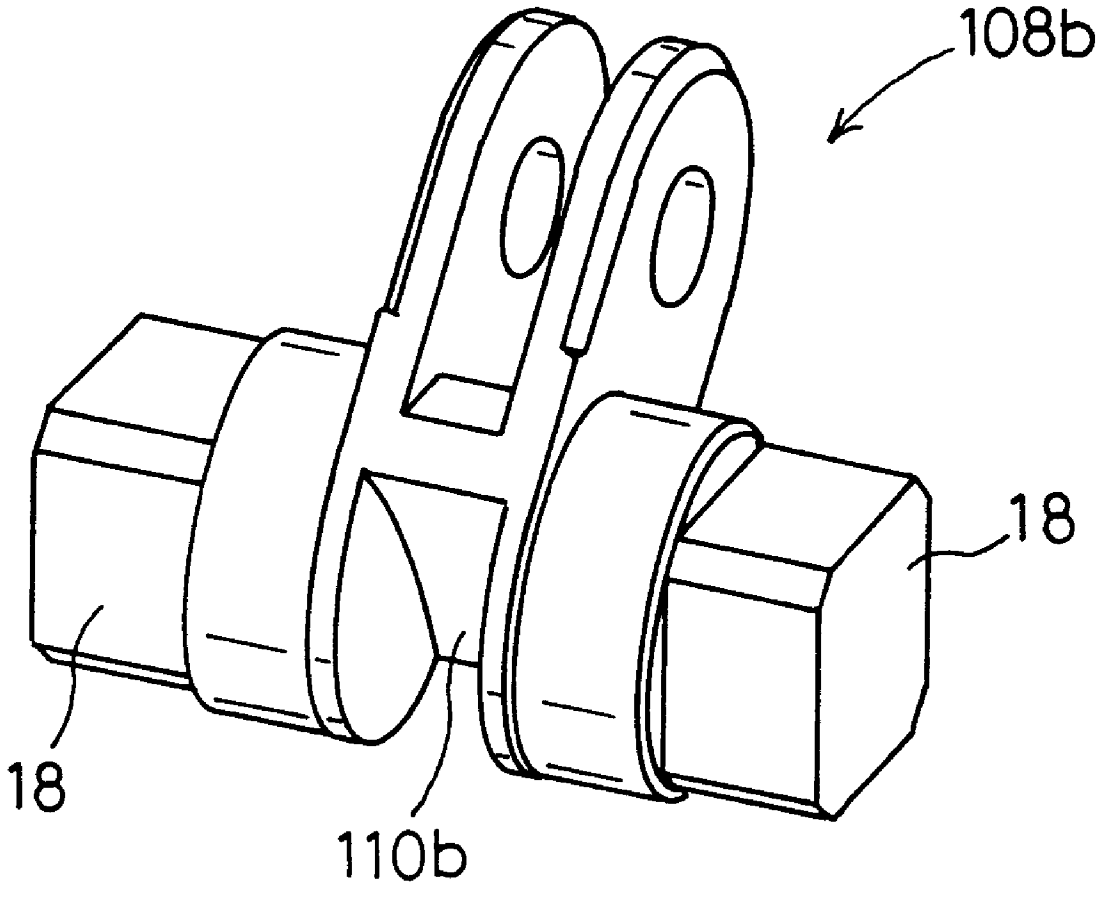
FIG. 13 shows a perspective view illustrating a support lever incorporated in the clamp apparatus according to the second modified embodiment.
Figure 14:
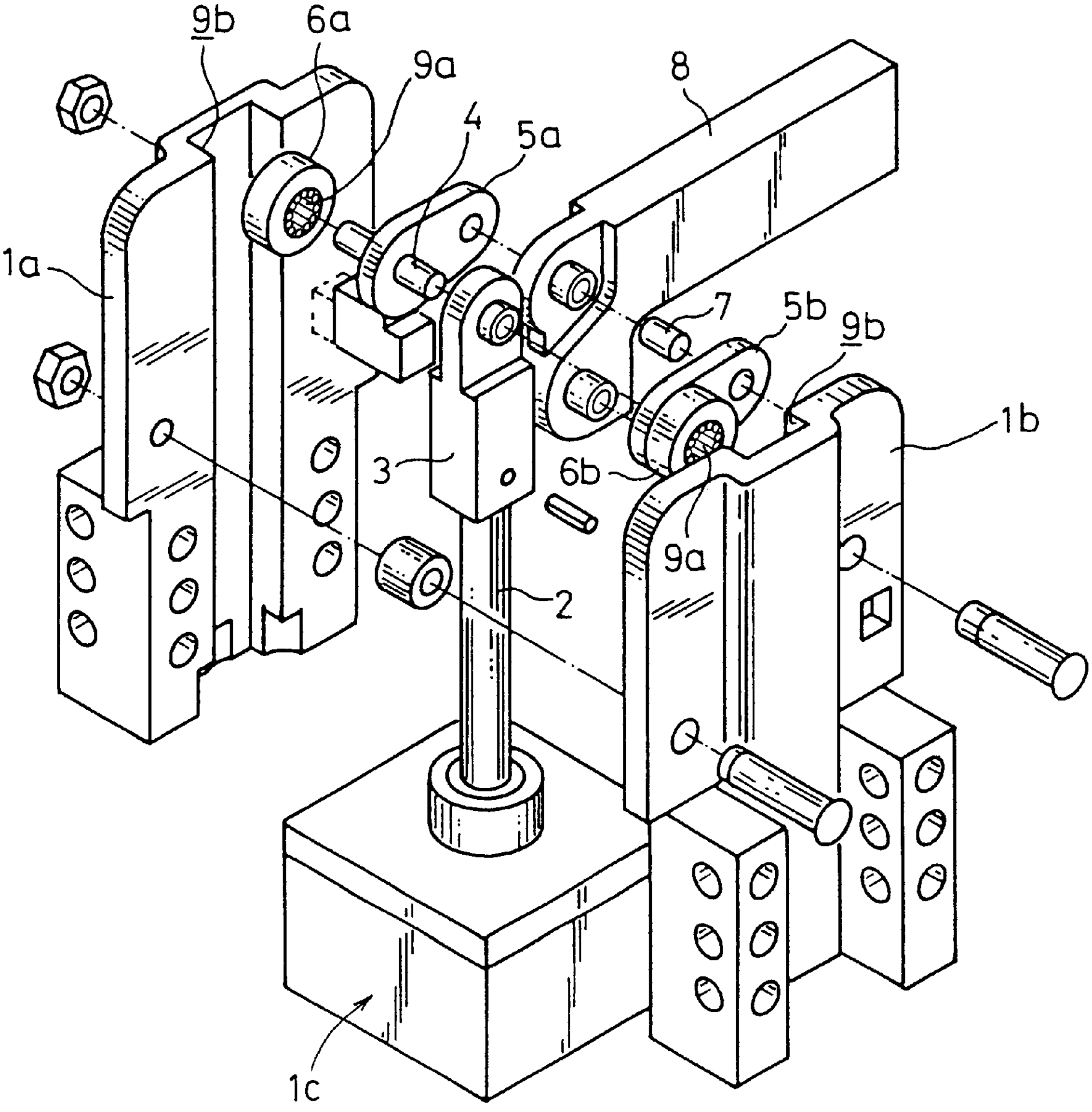
FIG. 14 shows an exploded perspective view illustrating major parts of a clamp cylinder concerning the conventional technique.
Figure 15:
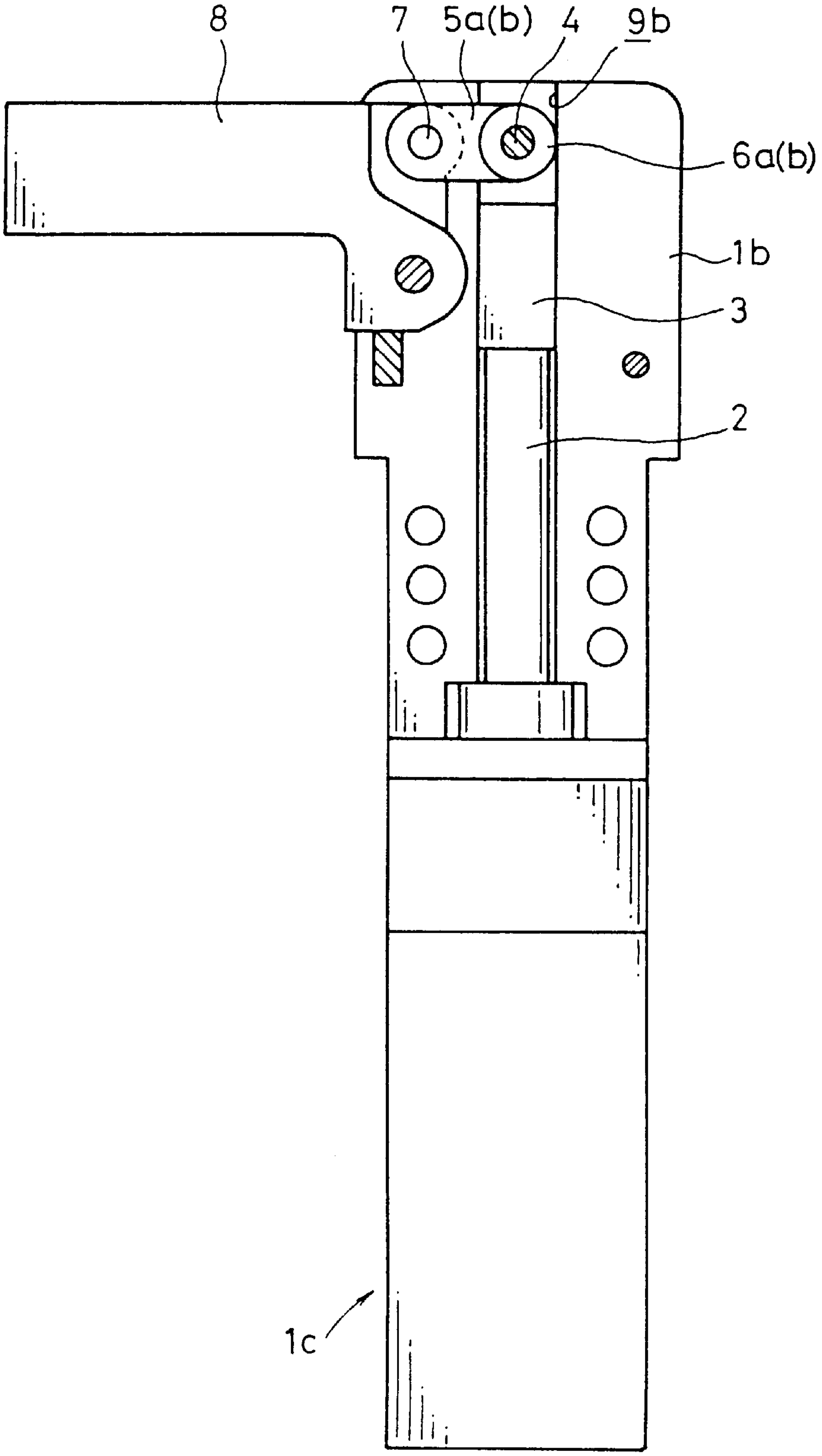
FIG. 15 shows, with partial vertical cross section, a side view illustrating the clamp cylinder shown in FIG. 14.

As shown in FIGS. 10 and 13, a fastening section 110*a*, 110*b* functioning as a mechanism for regulating the angle of rotation of the arm 20 is provided between a pair of bearing sections 18 having rectangular cross sections formed at both end portions of the support lever 108*a*, 108*b*. An abutment surface 112*a*, 112*b* (see FIGS. 8 and 11), which is composed of an inclined surface, is formed for the fastening section 110*a*, 110*b*.

In this arrangement, the abutment surface 112*a*, 112*b* of the support lever 108*a*, 108*b* abuts against a lever stopper 75. Accordingly, the angle of rotation $\theta$ of the arm 20 is regulated at the initial position in the unclamping state. The abutment surface 112*a*, 112*b* is preferably formed by inclined surfaces having a variety of angles of inclination corresponding to the angle of rotation $\theta$ of the arm 20 to be set.

A pair of proximity switches 118*a*, 118*b*, which detect the position of rotation of the arm 20 by sensing a dog 116 made of metal to make displacement integrally with the knuckle block 102*a*, 102*b*, are provided on the first side surface of the body 12.

In the first and second modified embodiments, the following effects or advantages are obtained by regulating the angle of rotation $\theta$ of the arm 20.

First, it is possible to avoid the collision or the contact of the arm 20 with another apparatus, another member or the like that is arranged closely to the clamp apparatus 100*a*, 100*b* by limiting the angle of rotation $\theta$ of the arm 20. Thus, it is possible to effectively use the narrow space for installation.

Second, the cycle of the rotary action of the arm 20 is quickened by limiting the angle of rotation $\theta$ of the arm 20 to be small. Thus, it is possible to improve the operation efficiency.

Third, the displacement amount of the piston 30 is decreased by limiting the angle of rotation $\theta$ of the arm 20. Thus, it is possible to save the consumed amount of air for displacing the piston 30.

In the first and second modified embodiments, the angle of rotation $\theta$ of the arm 20 is set to be about 45 degrees and about 75 degrees. However, it is a matter of course that the angle of rotation $\theta$ of the arm 20 can be variously set by assembling another knuckle block and another support lever (not shown) corresponding to the angle of rotation $\theta$ of the arm 20 when the clamp apparatus 100*a*, 100*b* is assembled.

The other effect and function are the same as those of the embodiment shown in FIG. 1, detailed explanation of which is omitted.

What is claimed is:

1. A clamp apparatus comprising:

a body;

a driving mechanism for displacing a rod member provided at the inside of said body in an axial direction of said body;

a toggle link mechanism including a link member connected to said rod member and a support lever linked to said link member, for converting rectilinear motion of said rod member into rotary motion;

an arm connected to said toggle link mechanism, for making rotation by a predetermined angle in accordance with a driving action of said driving mechanism;

a long hole formed for said link member, for being engaged with a knuckle pin provided on a first end side of said rod member; and a fastening mechanism formed with a fastening surface for regulating a rotary action of said support lever, wherein said fastening mechanism is composed of a lever stopper, and a rotary action of said arm is regulated at an initial position in an unclamping state by allowing a side surface of said support lever to abut against said fastening surface of said lever stopper.

2. The clamp apparatus according to claim 1, wherein said lever stopper is formed separately from a casing at the inside of said casing, or said lever stopper is formed integrally with said casing.

3. The clamp apparatus according to claim 1, wherein said driving mechanism is composed of a cylinder section including a piston which is displaceable in accordance with an action of pressure fluid supplied to a cylinder chamber via a pair of pressure fluid inlet/outlet ports.

4. The clamp apparatus according to claim 1, wherein a mechanism for regulating an angle of rotation of said arm to be a predetermined angle is provided at the inside of said body.

5. The clamp apparatus according to claim 5, wherein said mechanism for regulating the angle of the rotation of said arm to be the predetermined angle is composed of a fastening section formed for said support lever, and said angle of the rotation of said arm is regulated at an initial position in an unclamping state by allowing an abutment surface of said fastening section to abut against a lever stopper.

6. The clamp apparatus according to claim 1, wherein a guide roller, which makes contact with a curved surface formed at a first end of said link member, is provided at the inside of said body.

* * * * *